US012621428B2

(12) United States Patent
Dabral et al.

(10) Patent No.: US 12,621,428 B2
(45) Date of Patent: *May 5, 2026

(54) FAIL SAFE SURROUND VIEW

(71) Applicant: TEXAS INSTRUMENTS INCORPORATED, Dallas, TX (US)

(72) Inventors: Shashank Dabral, Allen, TX (US); Aishwarya Dubey, Plano, TX (US); Gowtham Abhilash Tammana, Irving, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/811,237

(22) Filed: Aug. 21, 2024

(65) Prior Publication Data

US 2024/0414315 A1      Dec. 12, 2024

Related U.S. Application Data

(63) Continuation of application No. 17/538,661, filed on Nov. 30, 2021, now Pat. No. 12,120,288.

(51) Int. Cl.
| | |
|---|---|
| *H04N 17/00* | (2006.01) |
| *G06T 1/20* | (2006.01) |
| *H04N 7/18* | (2006.01) |
| *H04N 23/60* | (2023.01) |
| *H04N 23/80* | (2023.01) |
| *H04N 23/90* | (2023.01) |

(52) U.S. Cl.
CPC ............. *H04N 17/002* (2013.01); *G06T 1/20* (2013.01); *H04N 7/181* (2013.01); *H04N 23/64* (2023.01); *H04N 23/80* (2023.01); *H04N 23/90* (2023.01); *G06T 2200/28* (2013.01)

(58) Field of Classification Search
None
See application file for complete search history.

(56) References Cited

U.S. PATENT DOCUMENTS

| | | |
|---|---|---|
| 10,523,865 B2 | 12/2019 | Appia et al. |
| 2007/0091173 A1 | 4/2007 | Kade et al. |
| 2017/0195564 A1 | 7/2017 | Appia et al. |
| 2017/0232896 A1 | 8/2017 | Bassi et al. |
| 2019/0057046 A1 | 2/2019 | Herrmann et al. |
| 2019/0258251 A1 | 8/2019 | Ditty et al. |

OTHER PUBLICATIONS

Partial European Search Report for 22210701.3, dated May 3, 2023.

*Primary Examiner* — Samira Monshi
(74) *Attorney, Agent, or Firm* — Michelle F. Murray; Frank D. Cimino

(57) ABSTRACT

A technique including capturing, by one or more cameras of a set of cameras disposed about a vehicle, one or more images, wherein a surround view system of the vehicle is configured to render a surround view image using a first hardware accelerator based on the one or more images, determining that a first hardware accelerator is unavailable, and rendering the surround view image using a second hardware accelerator based on the captured one or more images.

20 Claims, 6 Drawing Sheets

114

113

111

110

112

133

134

132

FAIL SAFE SURROUND VIEW

CROSS REFERENCE TO RELATED APPLICATIONS

This application is a continuation of and claims priority to U.S. application Ser. No. 17/538,661, filed Nov. 30, 2021, which is hereby incorporated herein by reference in its entirety.

BACKGROUND

Increasingly, vehicles, such as cars, airplanes, robots, etc., are being equipped with multiple external cameras to provide to the operator of the vehicle external views of the area surrounding the vehicle. These external views are commonly used to help maneuver the vehicle, such as when backing up or parking a car. These external views are a safety system as they can help vehicle operators detect and avoid objects, people, animals, etc., that may not be otherwise visible. Multiple camera views may be stitched together to form an external surround view around the vehicle. Generating these multi-camera views requires multiple cameras, failure of one or more cameras and/or camera support systems can hinder operations of such systems. Additionally, software for stitching and rendering the camera views may be running in the context of a high level operating system (HLOS) and software issues may also cause the software for stitching and rendering the camera views to become non-operational. Therefore, it is desirable to have an improved technique for fail safe operation of a surround view system.

SUMMARY

This disclosure relates to a technique including capturing, by one or more cameras of a set of cameras disposed about a vehicle, one or more images, wherein a surround view system of the vehicle is configured to render a surround view image using a first hardware accelerator based on the one or more images. The technique further includes determining that a first hardware accelerator is unavailable and rendering the surround view image using a second hardware accelerator based on the captured one or more images.

Another aspect of the present disclosure relates to an electronic device, including an image signal processor configured to receive one or more images captured by one or more cameras, of a set of cameras, disposed about a vehicle. The electronic device further includes a first processor configured to execute instructions to cause the first processor to render a surround view image around a vehicle using a first hardware accelerator based on the received one or more images. The electronic device also includes a second processor configured to execute instructions to cause the second processor to determine that the first hardware accelerator is unavailable and cause the surround view image to be rendered using a second hardware accelerator based on the one or more images captured.

Another aspect of the present disclosure relates to non-transitory program storage device including instructions stored thereon to cause a first processor to render a surround view image around a vehicle using a first hardware accelerator based on one or more cameras, of a set of cameras, disposed about a vehicle. The instructions further cause a second processor to determine that the first hardware accelerator is unavailable and cause the surround view image to be rendered using a second hardware accelerator.

BRIEF DESCRIPTION OF THE DRAWINGS

For a detailed description of various examples, reference will now be made to the accompanying drawings in which.

DETAILED DESCRIPTION

Figure 1A:
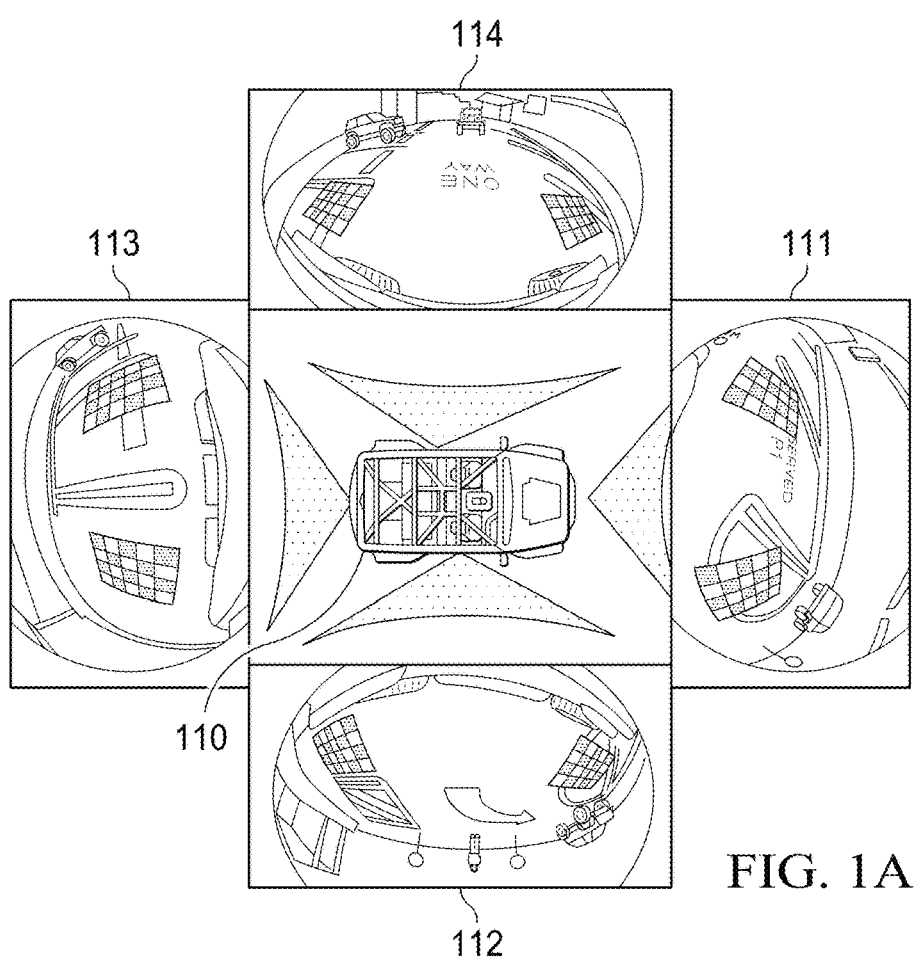
FIGS. 1A and 1B are diagrams illustrating a technique for producing a 3D surround view, in accordance with aspects of the present disclosure.

FIG. 1A is a diagram illustrating a technique for producing a 3D surround view, in accordance with aspects of the present disclosure. The process for producing a 3D surround view produces a composite image from a viewpoint that appears to be located directly above a vehicle looking straight down. In essence, a virtual top view of the neighborhood around the vehicle is provided.

Vehicle surround view systems normally include a set of four to six cameras, such as fish-eye cameras, mounted around a vehicle 110. For example, a camera set includes one at the front of the vehicle 110, another at the rear of the vehicle 110, and one on each side of the vehicle 110. Images produced by each camera may be provided to an image signal processing system (ISP) that includes memory circuits for storing one or more frames of image data from each camera. Fish-eye images 111-114 captured by each camera may be conceptually arranged around the vehicle 110, for example.

The general process of producing a surround view from multiple fish eye lens cameras is described in: "Surround view camera system for ADAS on TI's TDAx SoCs," Vikram Appia et al, October 2015, which is incorporated by reference herein. A basic surround view camera solution typically includes two algorithm components: geometric alignment and composite view synthesis. Geometric alignment corrects the fish-eye distortion for input video frames and converts them to a common birds-eye perspective. The synthesis algorithm generates the composite surround view after geometric correction. To produce a seamlessly stitched surround view output, another algorithm referred to as "photometric alignment" may be applied. Photometric alignment corrects the brightness and color mismatch between adjacent views to achieve seamless stitching. Photometric correction is described in detail, for example, in U.S. patent application Ser. No. 14/642,510, entitled "Method, Apparatus and System for Processing a Display From a Surround View Camera Solution," filed Mar. 9, 2015 which is incorporated by reference herein.

Camera system calibration may include both fish-eye lens distortion correction (LDC) and perspective transformation. For fish-eye distortion correction, a radial distortion model may be used to remove fish-eye from original input frames by applying the inverse transformation of the radial distortion function. After LDC, four extrinsic calibration matrices may be estimated, one for each camera, to transform four input LDC-corrected frames so that all input views are properly registered in a single world co-ordinate system. A chart-based calibration approach may be used. The content of the chart is designed to facilitate the algorithm accurately and reliably finding and matching features. Chart based calibration is discussed in detail, for example, in U.S. patent application Ser. No. 15/294,369 entitled "Automatic Feature Point Detection for Calibration of Multi-Camera Systems," filed Oct. 14, 2016 which is incorporated by reference herein.

Figure 1B:
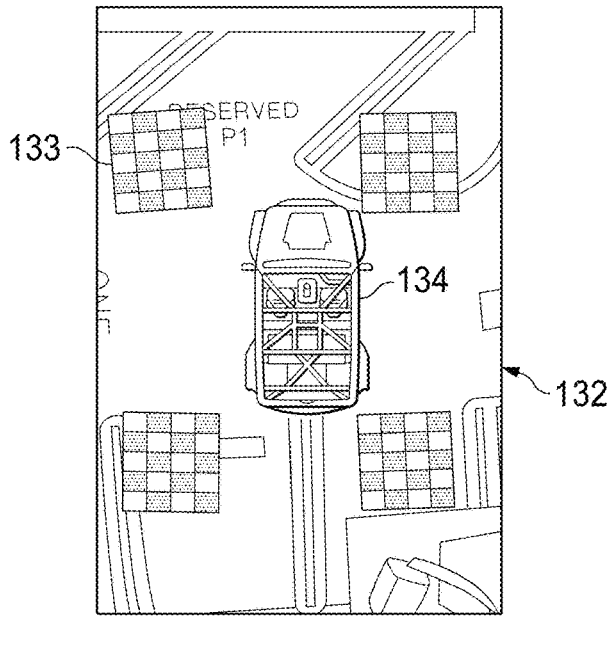

Assuming proper geometric alignment is already applied to the input frames, a composite surround view 132 of FIG. 1B may be produced using, for example, a digital signal processor (DSP). The composite surround view uses data from input frames from the set of cameras. The overlapping regions are portions of the frames that come from the same physical world but are captured by two adjacent cameras, i.e., O{m,n}, where m=1, 2, 3, 4, and n=(m+1) mod 4. O{m,n} refers to the overlapping region between view m and view n, and n is the neighboring view of view m in clockwise order. At each location in O{m,n}, there are two pixels available, i.e., the image data from view m and its spatial counterpart from view n. The overlapping regions may be blended based on weights assigned to the overlapping pixels and/or portions of the overlapping regions.

The calibrated camera system produces a surround view synthesis function which receives input video streams from the four fish-eye cameras and creates a composite 3D surround view 132. The fish-eye correction, perspective warp, alignment, and bilinear/bi-cubic interpolation on the image frames from each of the four fish-eye cameras may be performed by one or more surround view hardware accelerators (SVHA), which may be incorporated as a part of an ISP, DSP, and/or graphics processing unit (GPU). The ISP, DSP, and/or GPU may also perform stitching and may overlay an image of a vehicle, such as vehicle image 134, on the final composite output image 132.

Figure 2:
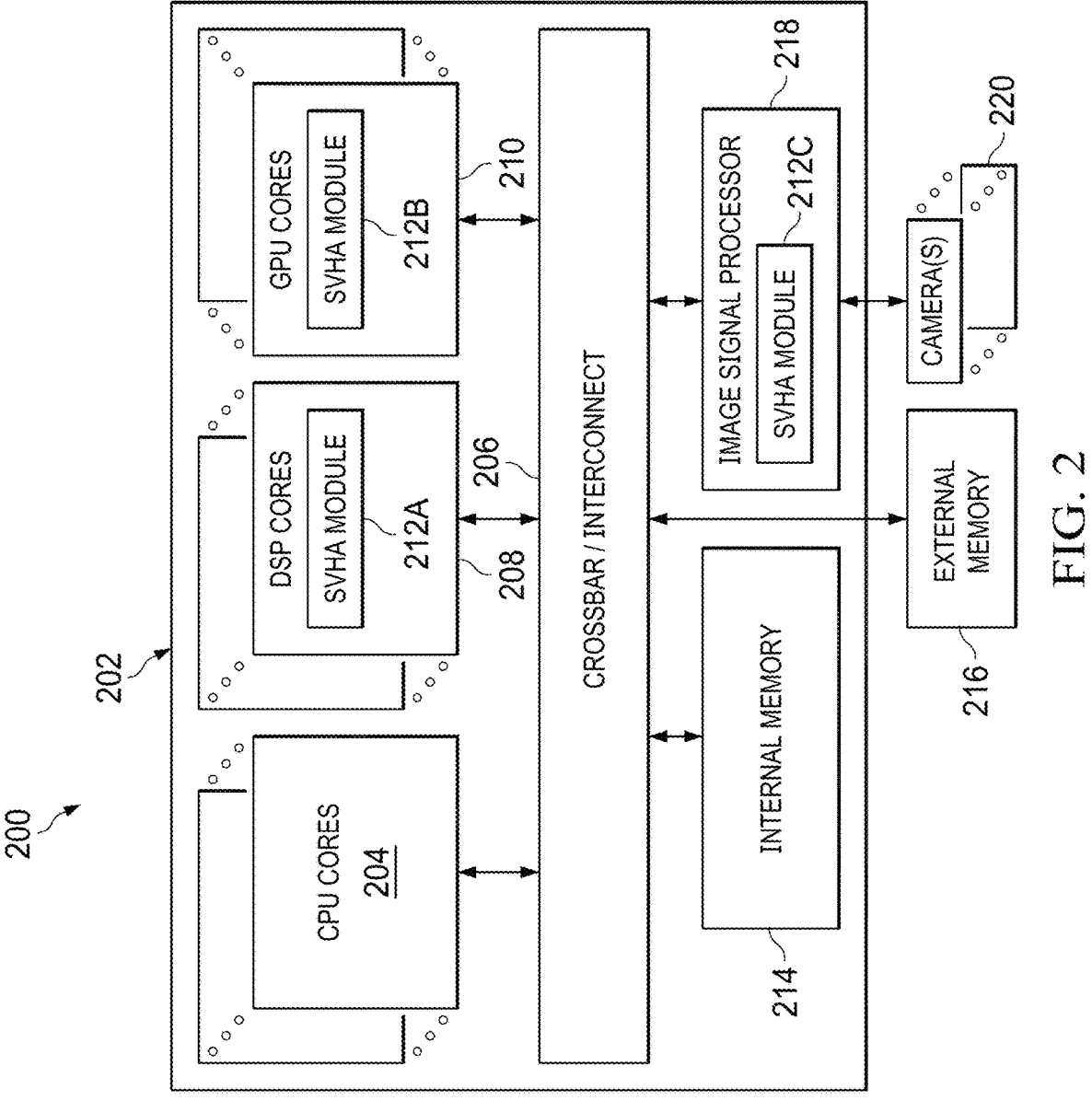
FIG. 2 is a block diagram illustrating a device for producing a surround view, in accordance with aspects of the present disclosure.

FIG. 2 is a block diagram illustrating a device 200 for producing a surround view, in accordance with aspects of the present disclosure. As shown, the device 200 may be system on a chip (SoC) 202. The SoC 202 may include multiple components integrated into a single chip (e.g., a single integrated circuit die). The multiple components of the SoC 202 may be configured to perform different tasks. As shown, the SoC 202 includes one or more central processing unit (CPU) cores 204. The CPU cores 204 may be configured for general computing tasks. For example, the CPU cores 204 may execute portions of a high-level operating system. Examples of the high-level operating system may include Linux (Linux is a registered trademark of Linus Torvalds) and QNX (QNX is a registered trademark of Blackberry Ltd. Corp.), etc.

The SoC 202 may also include other processing cores such as DSP cores 208 and GPU cores 210. As shown the ISP 218, DSP cores 208 and GPU cores 210 may include SVHA modules 212C, 212A, and 212B, respectively. The processing cores, including CPU cores 204, DSP cores 208, and GPU cores 210, may be interconnected via a crossbar (e.g., interconnect) 206, which interconnects and routes data between various components of the device. In some cases, the crossbar 206 may be a memory controller or any other circuit that can provide an interconnect between peripherals. Peripherals may include host peripherals (e.g., components that access memory, such as various processors, processor packages, direct memory access (DMA)/input output components, etc.) and target peripherals (e.g., memory components, such as double data rate (DDR) random access memory (RAM), other types of RAM, DMA/input output components, etc.). In this example, the crossbar 206 couples the peripherals including the processing cores, an internal memory 214, an external memory 216, and an image signal processor 218. The image signal processor 218 may be coupled to one or more cameras 220 and may receive images captured by the cameras 220.

In some cases, the GPU core 210 may be relatively more capable of and/or faster at performing operations related to graphical rendering as compared to the DSP cores 208. For example, the GPU core 210 may be able to render views from additional angles or perform a higher quality stitching/warping as compared to views rendered by the ISP 218 and/or DSP 208. In such cases, the device 200 may be configured to generate the surround view using the GPU core 210. The increased capability of the GPU core 210 may come with increased complexity and a HLOS may be used to operate a GPU core 210. For example, GPU cores 210 may be interfaced with a processor as a I/O device via a driver and may not be directly managed and/or scheduled by the processor. Such aspects make integrating GPU cores 210 using other types of operating systems, such as a real-time operating system (RTOS), difficult as the RTOS may be unable to directly schedule and guarantee when a process will finish executing on the GPU cores 210.

While operating GPU cores 210 is relatively easier in the context of a HLOS, HLOSs may not offer the stability of RTOSs. In some cases, HLOSs may fail (e.g., crash) in such a way as to render the surround view application inoperative. As surround view applications and/or systems may be considered safety critical, a HLOS crash disabling the surround view is suboptimal. Additionally, surround view systems often employ multiple camera views and may depend on multiple hardware components to provide such views, such as the cameras themselves, any network connections between the cameras and the processing device(s) executing the surround view application, etc. Additionally, vehicles, and by extension, the hardware component replied upon by the surround view system, may be subject to inclement weather and conditions which may damage and/or interrupt communications with the hardware components. Resilience to such failure modes of the surround view system may be provided by a technique for fail safe surround view.

Figure 3:
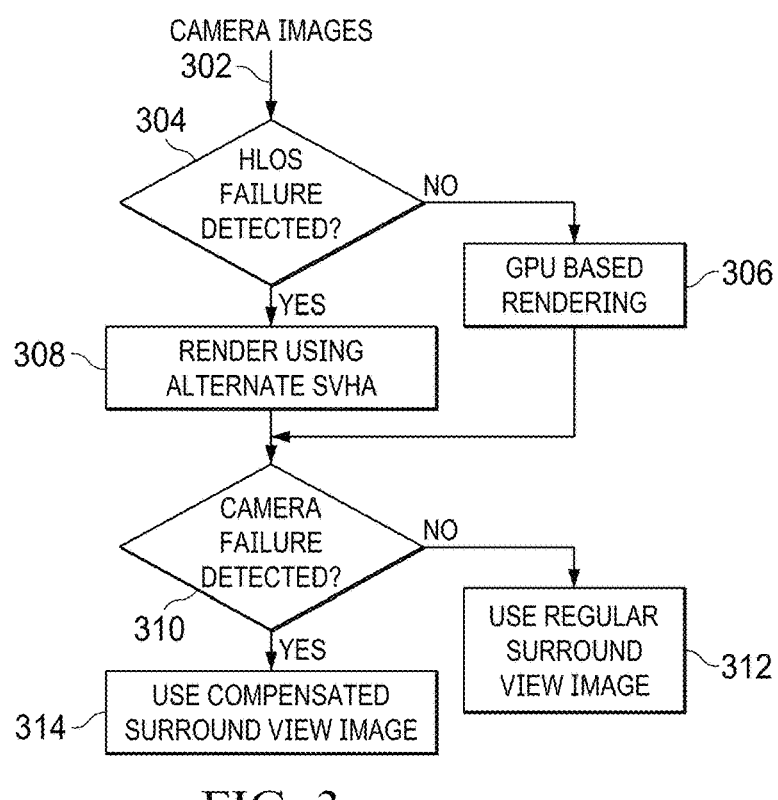
FIG. 3 is a block diagram illustrating a technique for fail safe surround view, in accordance with aspects of the present disclosure.

FIG. 3 is a block diagram 300 illustrating a technique for fail safe surround view, in accordance with aspects of the present disclosure. As shown, camera images 302 may be received by a surround view system. At block 304, one or more components of the surround view system may determine whether a HLOS failure has been detected. For example, one or more components of the surround view system may monitor to ensure frames for the surround view are being rendered within a threshold amount of time. If a HLOS failure is not detected, then execution proceeds to block 306 where the surround view is rendered via the GPU, consistent with existing systems. If a HLOS failure is detected, execution may proceed to block 308. At block 308 a surround view may be rendered by alternate SVHA, other than the GPU, running outside of the context of the HLOS. For example, the ISP and/or DSP may include a SVHA executing in the context of a RTOS running in parallel of the HLOS. The surround view may be generated using the SVHA of the ISP. Rendering a surround view on an SVHA of the ISP is described in detail, for example, in U.S. Pat. No. 10,523,865, which is incorporated herein by reference. As another example, the surround view image may be rendered by a SVHA of a DSP that is executing as an embedded application of the DSP outside of the context of an operating system. In some cases, the surround view generated using the alternate SVHA may be associated with a reduced experience as compared to the surround view experience provided by the GPU. For example, the surround view generated using the alternate SVHA may have fewer available views (e.g., top down), the views may be from a fixed location, with relatively more distortion in the view, etc.

At block 310, one or more components of the surround view system may determine whether a camera failure has been detected. For example, the ISP may detect whether a signal, or no signal, is being received, whether a same image frame is being constantly sent by a camera, etc. to determine whether a camera has failed. If a camera failure is not detected, then execution may proceed to block 312. At block 312, a regular surround view may be used. For example, the surround view image that is normally displayed (via the GPU or alternate SVHA) is used. If a camera failure is detected, then execution may proceed to block 314. At block 314, a compensated surround view image 314 may be used. For example, the compensated surround view image may adjust blend lines, that is where the image from one camera may be blended and transition to the image from another camera, of the rendered surround view. Adjusting the blend lines may help increase an amount of an image from a camera neighboring the failed camera that is displayed to help compensate for the failed camera.

Figure 4:
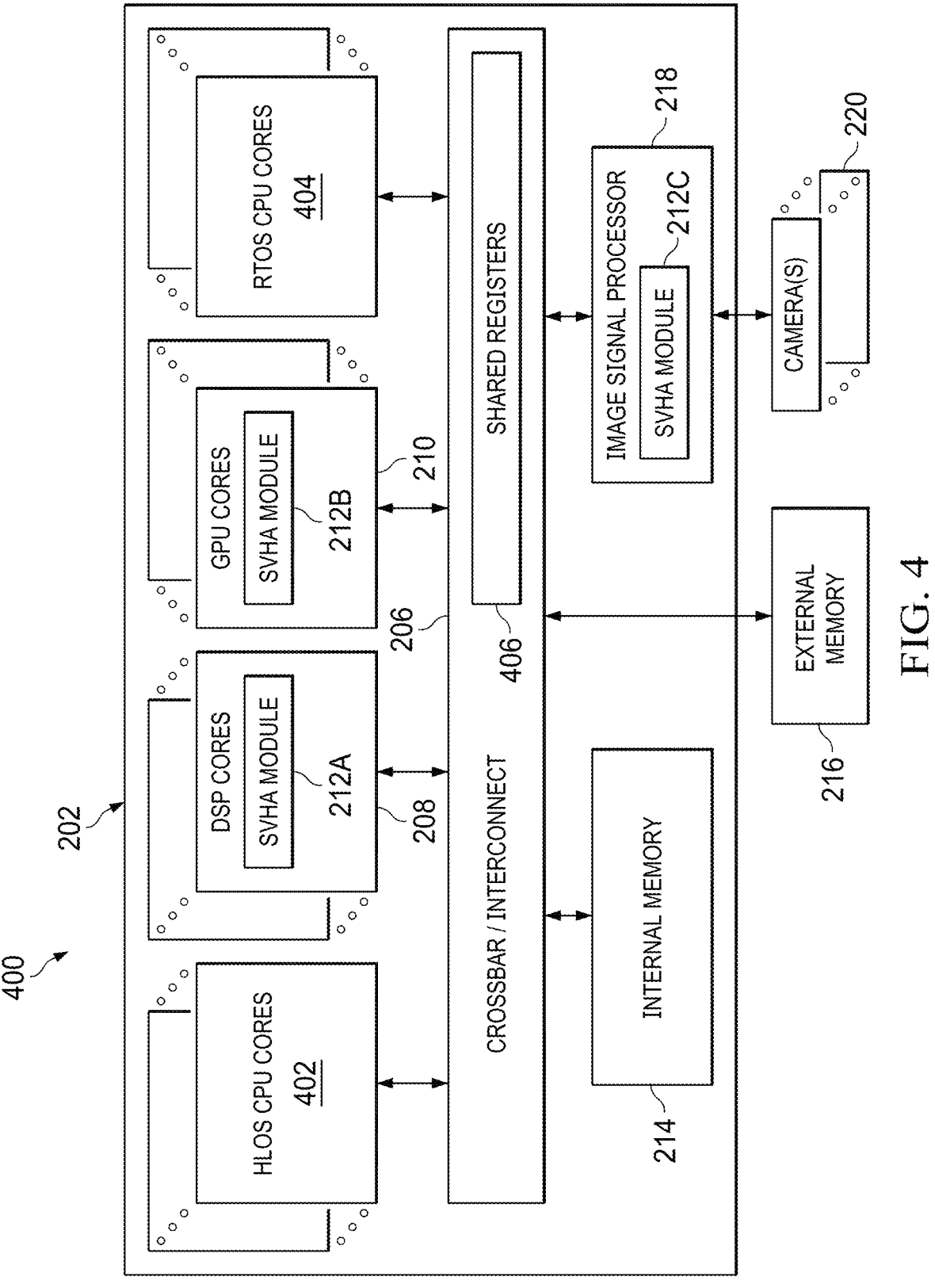
FIG. 4 is a block diagram illustrating a device for producing a fail-safe surround view, in accordance with aspects of the present disclosure.

FIG. 4 is a block diagram illustrating a device 400 for producing a fail-safe surround view, in accordance with aspects of the present disclosure. Device 400 may be a variant of device 200 where the CPU cores 204 may be divided into two sets, a set of HLOS CPU cores 402 and a set of RTOS CPU cores 406. The HLOS CPU cores 402 may be configured to execute a HLOS. In parallel, the RTOS CPU cores 404 may execute a RTOS. In some cases, the RTOS environment may be used to run lower level and/or background functionality for which a high reliability may be beneficial, such as some drivers, hardware monitoring/controlling, etc. The HLOS may be used to run more complex software, such as a more fully featured user interface, applications which use the GPU cores, media players, etc. The applications executing in the HLOS and the RTOS may communicate via a variety of techniques, including via one or more shared registers 406. In some cases, the one or more shared registers 406 may be located in, or accessed via the crossbar 206. In some cases, the HLOS CPU cores 402 may be relatively more powerful (e.g., run at a higher clock speed, able to perform more computations per clock cycle, higher transistor count etc.) than the RTOS CPU cores 404.

Figure 5:
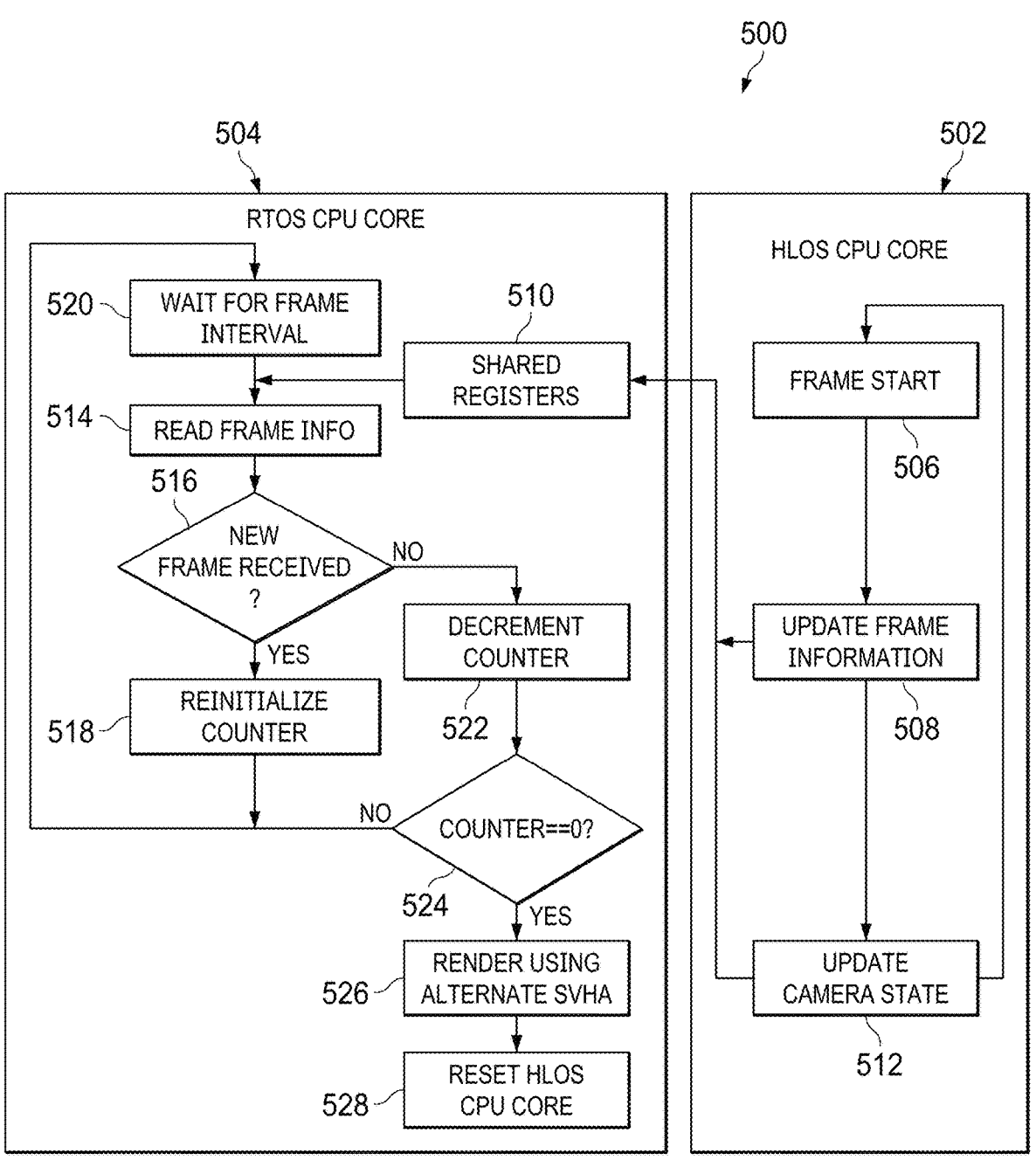
FIG. 5 is an organizational flowchart illustrating a technique for detecting a HLOS failure, in accordance with aspects of the present disclosure.

FIG. 5 is an organizational flowchart illustrating a technique 500 for detecting a HLOS failure, in accordance with aspects of the present disclosure. While technique 500 includes operations as performed by two processors, it should be understood that in other configurations, a single processor, or more than two processors, may be configured to perform the operations as shown in technique 500.

As shown, technique 500 includes operations performed by one or more HLOS CPU cores 502 and one or more RTOS CPU cores 504. As a safety related feature, the surround view system may have certain framerate requirements. These requirements may be provided by, for example a manufacturer integrating the surround view system to a vehicle. Failure of the HLOS and/or components of the surround view system executing on the HLOS may impact the surround view systems ability to meet those framerate requirements. Additionally, information about the framerate provides an indication of the state of the HLOS and/or components of the surround view system executing on the HLOS and the information may be used to trigger a fallback for rendering the surround view.

Here, rendering the surround view may, in normal operations, be performed by a GPU in the context of the HLOS and one or more HLOS CPU cores 502. In this example, rendering a frame may be performed by the HLOS CPU cores 502 by preparing the information and instructions needed for the render and then calling the GPU driver with the information and instructions to start the frame rendering process 506. The GPU driver then causes the GPU to perform the rendering based on the instruction and information and when the GPU is complete, the GPU may issue a handle to the HLOS CPU core 502 to indicate that the rendering has been performed. At block 508, frame information from rendering the frame may be obtained, for example, based on the handle, by querying the driver, etc. The frame information may be obtained at a predetermined rate, such as for each frame, every other frame, etc. The frame information may include a time stamp and/or frame number associated with the frame. This frame information may be written to one or more shared registers 510. The shared registers 510 may be one or more registers that are accessible by both the RTOS CPU core 504 and the HLOS CPU core 502. The HLOS CPU cores 502 may also obtain updated camera state information 512 at a predetermined rate.

The camera state information 512 may be updated at the same rate the frame information 508 is updated, or the camera state information 512 may be updated at a different rate. In some cases, the camera state information 512 may be obtained from the ISP. The camera state information 512 may include information regarding the status of the cameras distributed about the vehicle, such as whether control information and data are being received from the camera, statistics related to the data being received from the cameras, and/or motion vectors as between images received by the cameras. For example, the ISP may receive, from each coupled camera, control information along with the captured image data. The control information may include information related to the operation of the camera, such as focus, exposure, white balance, etc. Where the ISP is not receiving control information and/or data from a camera, the ISP may indicate that the camera has failed to the HLOS CPU cores 502 and the camera state information 512 may be updated to indicate that the camera has failed.

In some cases, a camera may send control information and dark data. In some cases, a camera may be considered to have failed when image data sent by the camera is not representative of the visual environment the camera is directed at. Failures may include hardware failure related to the camera, but failures can be determined for fully functional hardware that is sending dark data. For example, a camera with a failed image sensor (or a covered image sensor) may continue to send control information, but the image data may effectively be all zeros. As another example, a camera with an operational image sensor, but is occluded, such as by being covered in mud/dirt, may continue to send control information along with image data that may effectively be all zeros. The ISP may be configured to detect that the camera is sending dark data and compare the image data with other neighboring cameras. For example, the ISP may generate statistics, such as a histogram, regarding the image data for each camera and the ISP may compare the statistics of the camera against neighboring cameras. If the statistics differ by more than a threshold amount, the ISP may determine that the camera has failed and the camera state information 512 may be updated to indicate that the camera has failed. More generally, the ISP may also be configured to detect that the camera is sending non-representative data, for example, by attempting to align image features in an overlapping area that should be visible by the camera and another camera (which may also be checked against yet another camera). If the ISP is unable to align the image features for the camera, then the ISM may determine that the camera has failed.

Similarly, in some cases, a camera may continue sending control information and the same image data over and over again (e.g., a frozen image). The ISP may be configured to determine a high-level motion vector by comparing multiple images received from the cameras to determine a perceived motion as between objects in the multiple images. This motion vector for a camera may be compared to motion vectors determined for other cameras to determine whether a camera may have a stuck image. For example, where a camera is sending the same image data repeatedly, the motion vector would be zero. If the other cameras are associated with non-zero motion vectors, then the ISP may determine that the camera has failed and the camera state information 512 may be updated to indicate that the camera has failed. In some cases, the camera motion vector may be compared to other motion information, such as global positioning system (GPS) information, information provided by an accelerometer, inertia sensor, or other such sensor. For instance, if a GPS system of one or more of the aforementioned sensors indicates the vehicle is in motion and yet one or more cameras is indicating a motion vector associated with little or no motion, then this may serve as an indication that the camera(s) corresponding to with the motion vector associated with little or no motion has failed.

A HLOS watchdog timer may execute on the RTOS CPU cores 504 monitoring the shared registers 510. At block 514, the frame information stored in the shared registers 510 by the HLOS CPU core 502 may be read. At block 516, the frame information read from the shared registers 510 may be compared to determine whether the frame information has been updated and hence a new frame (e.g., image frame) generated by the GPU and HLOS CPU core 502. For example, the frame information may include a time stamp and/or frame number associated with the frame and this time stamp and/or frame number may be compared to the previous time stamp and/or frame number to determine whether there has been a new frame generated. In some cases, the time stamp in the shared registers 510 may be compared to a current time stamp to determine whether there has been a new frame generated. If a new frame has been generated, then a counter may be reinitialized to a predetermined value at block 518.

The counter may be predetermined based on framerate requirements for the surround view system. In some cases, the counter may be user programmable to accommodate user defined framerate requirements. In some cases, the counter may allow a number of frames to be missed (e.g., dropped frames) before the counter expires as occasional dropped frames may be expected. Execution may then proceed to block 520 where the HLOS watchdog timer may wait a period in which the next frame is expected. This wait period is based on the refresh rate of the surround view system. For example, where the surround view system refreshes the surround view frames at 60 Hz, then the wait period may be 1/60 of a second. Execution then loops back to block 514.

If, at block 516, a determination is made that a new frame has not been generated, at block 522, the counter is decremented. If, at block 524, the counter has not reached zero, then execution may proceed to block 520 to wait until the next frame is expected, and then loop back to block 514 to check for the next frame. If, at block 524, the counter has reached zero, then execution may proceed to block 526 where the RTOS may trigger rendering the surround view by an alternate SVHA instead of the using the HLOS CPU core 502 and GPU based rendering. Execution may proceed to block 528 where the HLOS CPU core may be reset.

In some cases, the HLOS timer may be implemented along with existing GPU watchdog timers which may detect instances where the GPU crashes. Where a GPU crash is detected based on the GPU watchdog timer, the GPU may be reset. In some cases, crashes of the GPU may be detected and the GPU reset before the HLOS watchdog timer can trigger rendering the surround view by an alternate SVHA.

In some cases, the surround view by an alternate SVHA instead of the using the HLOS CPU core 502 and GPU based rendering prior to start up of the HLOS. In some cases, the RTOS can boot up and render a surround view substantially faster than a HLOS can boot up. For example, on initial vehicle start, the HLOS can take a number of seconds to boot up and render the surround view. During the boot up time of the HLOS, if a surround view is needed, the alternate SVHA generated surround view may be used. The alternate SVHA generated surround view may be triggered in substantially the same was as described in FIG. 5. For example, where the HLOS is booting up, the shared registers 510 may not be updated with frame information, allowing the counter to expire at block 524 and rendering the surround view by an alternate SVHA at block 526.

When rendering the surround view, whether by an alternate SVHA or the GPU, the rendered frame for the surround view may rendered as a compensated surround view frame based on whether a camera failure is detected (e.g., at block 314 of FIG. 3). As discussed above, an indication that a particular camera, of the cameras disposed about the vehicle, has failed may be provided, for example, by the ISP. Based on this indication, blend lines of adjacent cameras may be adjusted to help compensate for the failed camera(s).

Camaras have a certain field of view (FoV), which is the area of the surrounding world that the camera can image. For a vehicle with a surround view system, cameras are disposed about the vehicle such that the cameras are able to view an area around the vehicle. In some cases, the cameras are arranged such that the FoVs of the cameras overlap in certain areas. For example, fish-eye cameras and/or lenses may be used to provide a wide FoV while helping to reduce a number of cameras needed to provide the surround view. A perceived sharpness and/or resolution of a fish-eye camera/lens becomes more and more reduced the further off-center an object is due in part to the distortion effect produced by the fish-eye camera/lens. Some surround view systems are configured to reduce the perception of this reduced sharpness/resolution by blending and/or stitching multiple images captured by different cameras based on a blend line that is chosen to minimize the effect of the reduced sharpness/resolution. For example, a fish-eye camera may offer a 180 degree foV, but only ~110 degrees of the FoV may be only covered by the fish-eye camera. The other ~70 degrees of the FoV may overlap with FoVs of adjacent cameras and a blend line within the overlapping FoVs may be selected to help maximize image quality as between the cameras with overlapping FoVs. This blend line may be adjusted to help compensate for a camera failure.

Figure 6B:
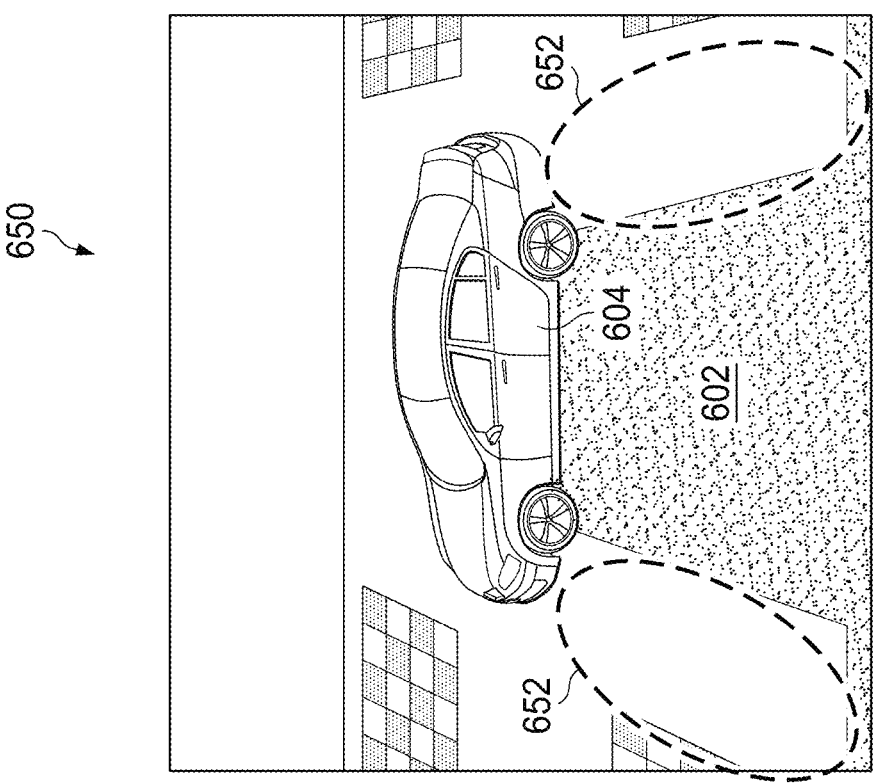
FIG. 6B is a drawing illustrating a compensated image from a surround view system with a failed camera, in accordance with aspects of the present disclosure.
Figure 6A:
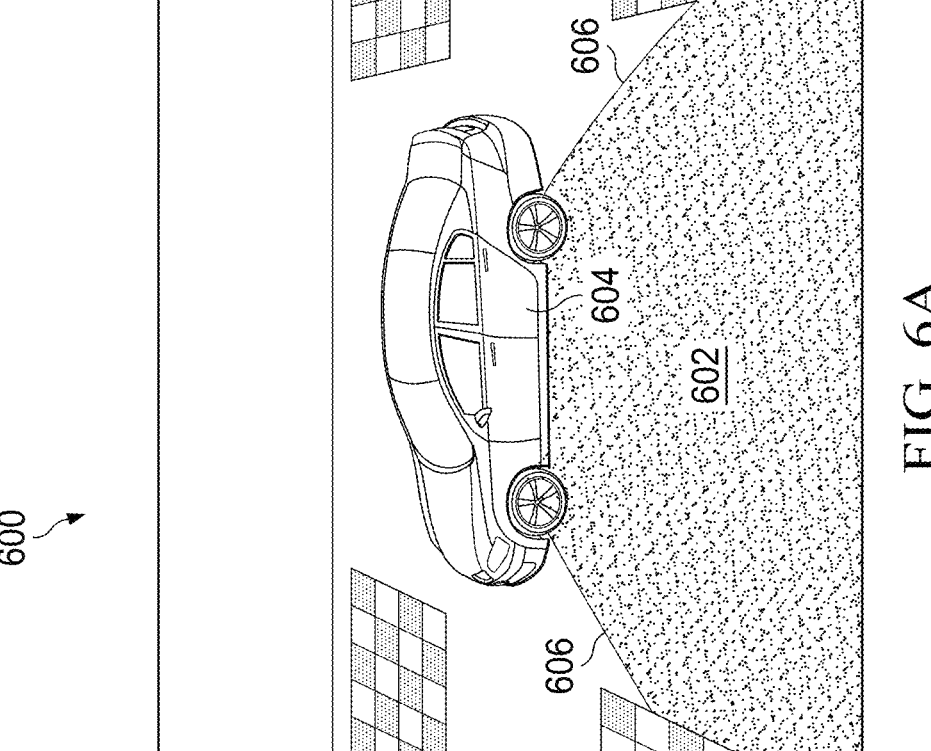
FIG. 6A is a drawing illustrating a non-compensated (e.g., regular) image from a surround view system with a failed camera, in accordance with aspects of the present disclosure.

FIG. 6A is a drawing 600 illustrating a non-compensated (e.g., regular) image from a surround view system with a failed camera, in accordance with aspects of the present disclosure. As shown, a dark area 602 with no visible details is shown for areas covered by the disabled camera on the left side of the drawn vehicle 604. The blend lines 606, as between the disabled camera on the left side of the vehicle 604 and the front and rear cameras, are visible as a boundary between where the image from the front and rear cameras views are available and the dark area 602 covered by the failed camera. As the blend line may not coincide with the full FoV of the image, adjusting the blend line for cameras adjacent to the failed camera to allow for the full FoV to be used to helps minimize a size of the dark area 602, as shown in drawing 650 of FIG. 6B. In drawing 650, the circled recovered areas 652 represent areas within the FoV of the front and rear camera adjacent to the failed left camera that were not displayed in the non-compensated image of drawing 600.

Figure 7:
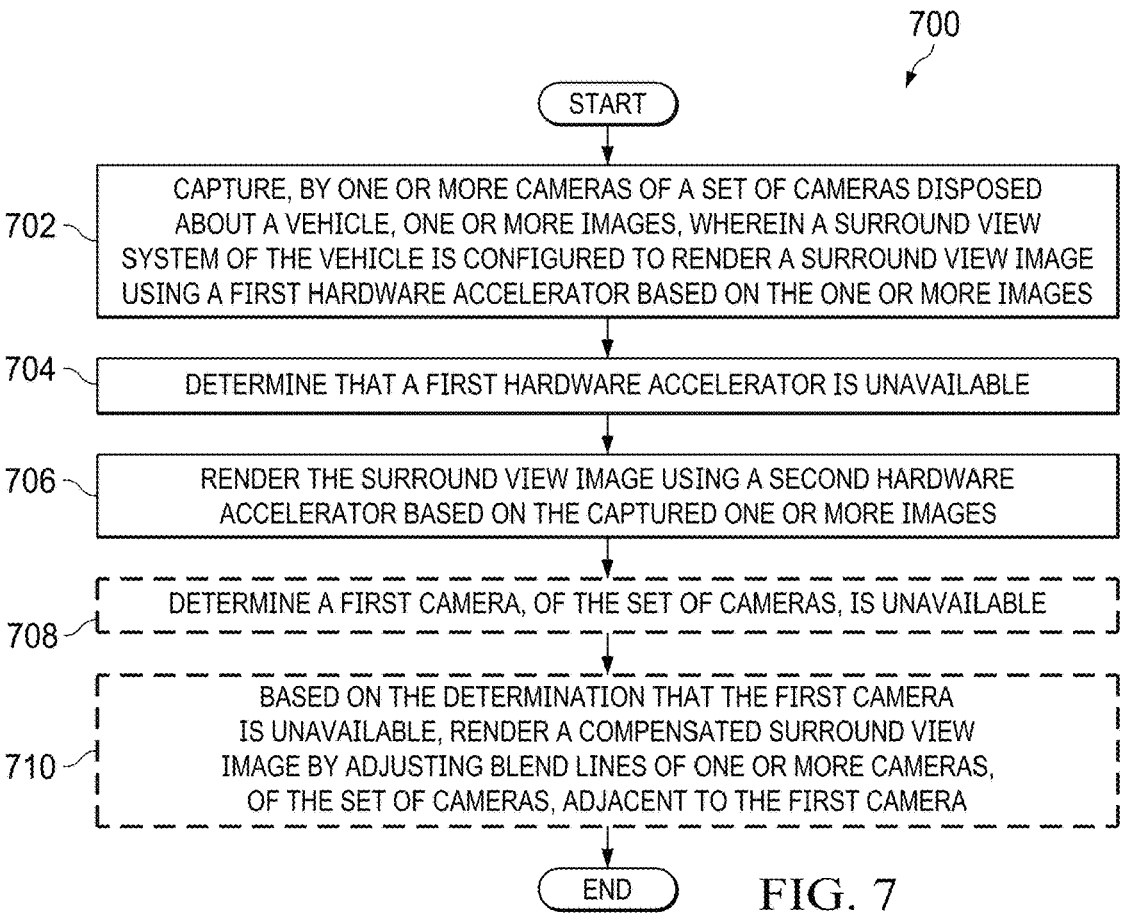
FIG. 7 is a flow diagram illustrating a technique for generating a fail safe surround view, in accordance with aspects of the present disclosure The same reference number is used in the drawings for the same or similar (either by function and/or structure) features.

FIG. 7 is a flow diagram 700 illustrating a technique for generating a fail safe surround view, in accordance with aspects of the present disclosure. At block 702, one or more cameras of a set of cameras disposed about a vehicle capture one or more images. A surround view system of the vehicle is configured to render a surround view image using a first hardware accelerator based on the one or more images. For example, an ISP of a surround view system may be configured to receive images from cameras that are arranged about the vehicle. The surround view system may be configured to render a surround view image (e.g., frame) from the received images using a GPU. At block 704, a determination that a first hardware accelerator is unavailable is made. For example, an indication that the GPU has completed a frame may be set, such as to a registry location. A watchdog timer may be used to monitor for the indication. If a threshold period of time passes without a new indication that the GPU has completed a frame, the surround view system may determine that the GPU and/or OS (such as a HLOS) the GPU is associated with, has failed (e.g., crashed). In some cases, the OS and/or GPU may be restarted. At block 706, the surround view image is rendered using a second hardware accelerator. For example, an alternate SVHA, such as a SVHA of the ISP may be used to render the surround view image. In some cases, the alternate SVHA may be accessed in the context of a second operating system such as a RTOS.

Optionally, at block 708, a determination may be made that a first camera, of the set of cameras is unavailable. In some cases, this determination may be made based on control data and/or image data from the camera. For example, the determination may be made that no control data and/or image data is received from the camera. As another example, the determination may be made based on dark data received from the camera or based on receiving the same image data over and over. Optionally, at block 710, based on the determination that the first camera is unavailable, a compensated surround view image may be rendered by adjusting blend lines of one or more cameras, of the set of cameras, adjacent to the first camera.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. Modifications are possible in the described examples, and other examples are possible within the scope of the claims.

What is claimed is:

1. A method, comprising:
receiving, by a device, image data from a set of cameras, wherein the set of cameras includes a first camera and a remainder of the set of cameras;
determining, by the device, whether or not there is a failure associated with the first camera; and
based on determining that there is a failure associated with the first camera, generating a composite image based on the image data received from the remainder of the set of cameras, but not the first camera.

2. The method of claim 1, further comprising:
detecting the failure associated with the first camera based on receiving a signal indicative of the failure, not receiving a signal indicative of lack of the failure, receiving repeated image data from the first camera, or a combination thereof.

3. The method of claim 1, wherein generating the composite image comprises:
determining a blend line representative of a boundary between a first area visibly covered by the first camera and a second area visibly covered by the remainder of the set of cameras;
adjusting the blend line so as to adjust the first area; and
generating the composite image based on the adjusted blend line.

4. The method of claim 1, further comprising:
determining whether there is a failure associated with a first image processing component of the device; and
based on determining that there is a failure associated with the first image processing component, generating the composite image using a second image processing component of the device.

5. The method of claim 4, wherein the first image processing component is a first hardware accelerator, and the second image processing component is a second hardware accelerator.

6. The method of claim 4, wherein the first image processing component is a graphics processing unit (GPU), and the second image processing component is a DSP.

7. The method of claim 4, wherein the first image processing component operates on a first operating system (OS), and the second image processing component operates on a second OS or operates without an OS.

8. The method of claim 4, further comprising:
detecting the failure associated with the first image processing component based on determining whether or not a frame is generated by the first image processing component.

9. The method of claim 8, wherein determining whether or not a frame is generated comprises determining whether or not the frame is generated based on information in a register received from the first image processing component.

10. The method of claim 9, wherein:
the information comprises frame information, camera state information, or a combination thereof;
the frame information comprises a time stamp associated with a frame, a frame number associated with a frame, or a combination thereof; and
the camera state information comprises a status of the first camera.

11. The method of claim 1, wherein the set of cameras is disposed about a vehicle, and wherein the composite image is a surround view image of the vehicle.

12. A system, comprising:
a first image processing component configured to:
receive image data from a set of cameras, wherein the set of cameras includes a first camera and a remainder of the set of cameras;
determine whether or not there is a failure associated with the first camera; and
based on a determination that there is a failure associated with the first camera, generate a composite image based on the image data received from the remainder of the set of cameras, but not the first camera.

13. The system of claim 12, wherein the first image processing component is further configured to:
detect the failure associated with the first camera based on receipt of a signal indicative of the failure, not receipt of a signal indicative of lack of the failure, receipt of repeated frames of same image data from the first camera, or a combination thereof.

14. The system of claim 12, wherein to generate the composite image, the first image processing component is configured to:
determine a blend line representative of a boundary between a first area visibly covered by the first camera and a second area visibly covered by the remainder of the set of cameras;
adjust the blend line so as to adjust the first area; and
generate the composite image based on the adjusted blend line.

15. The system of claim 12, further comprising:
a second image processing component configured to:
determine whether there is a failure associated with the first image processing component; and
based on a determination that there is a failure associated with the first image processing component, generate the composite image.

16. The system of claim 15, wherein the first image processing component is a graphics processing unit (GPU), and the second image processing component is a DSP.

17. The system of claim 15, wherein the first image processing component operates on a first operating system (OS), and the second image processing component operates on a second OS or operates without an OS.

18. The system of claim 15, wherein the second image processing component is further configured to:
detect the failure associated with the first image processing component based on a determination whether or not a frame is generated by the first image processing component within a specified period of time.

19. The system of claim 18, wherein the second image processing component is configured to determine whether or not a frame is generated by the first image processing component based on information associated with the frame in a register received from the first image processing component.

20. The system of claim 12, wherein the set of cameras is disposed about a vehicle, and wherein the composite image is a surround view image of the vehicle.

* * * * *